United States Patent
Su et al.

(10) Patent No.: US 11,151,358 B2
(45) Date of Patent: Oct. 19, 2021

(54) TARGET DETECTION METHOD AND APPARATUS, DEVICE, AND STORAGE MEDIUM

(71) Applicant: BEIJING SENSETIME TECHNOLOGY DEVELOPMENT CO., LTD., Beijing (CN)

(72) Inventors: Rui Su, Beijing (CN); Wanli Ouyang, Beijing (CN); Luping Zhou, Beijing (CN); Dong Xu, Beijing (CN)

(73) Assignee: BEIJING SENSETIME TECHNOLOGY DEVELOPMENT CO., LTD., Beijing (CN)

( * ) Notice: Subject to any disclaimer, the term of this patent is extended or adjusted under 35 U.S.C. 154(b) by 0 days.

(21) Appl. No.: 17/126,968

(22) Filed: Dec. 18, 2020

(65) Prior Publication Data

US 2021/0110138 A1 Apr. 15, 2021

Related U.S. Application Data

(63) Continuation of application No. PCT/CN2019/121773, filed on Nov. 28, 2019.

(30) Foreign Application Priority Data

Apr. 30, 2019 (CN) .......................... 201910364565.0

(51) Int. Cl.
*G06K 9/00* (2006.01)
*G06F 17/18* (2006.01)
(Continued)

(52) U.S. Cl.
CPC ......... *G06K 9/00201* (2013.01); *G06F 17/18* (2013.01); *G06T 5/002* (2013.01);
(Continued)

(58) Field of Classification Search
CPC ............ G06K 9/00201; G06K 9/3233; G06K 9/4671; G06K 2209/21; G06F 17/18; G06T 5/002; G06T 7/20; G06N 3/04; G06N 3/08
See application file for complete search history.

(56) References Cited

U.S. PATENT DOCUMENTS 9,025,875 B2   5/2015  Matsumoto
10,515,435 B2 * 12/2019 Navarrete Michelini ...................
                                                    G06N 3/0454
(Continued)

FOREIGN PATENT DOCUMENTS

CN       104268514 A    1/2015
CN       105913003 A    8/2016
(Continued)

OTHER PUBLICATIONS

Rui Su, etc., Improving Action Localization by Progressive Cross-stream Cooperation, 10 pages.
(Continued)

*Primary Examiner* — Mekonen T Bekele
(74) *Attorney, Agent, or Firm* — Cooper Legal Group LLC

(57) ABSTRACT

A target detection method and apparatus, a target detection device and a storage medium. The target detection method comprises: acquiring n types of detection frames which are determined by n different target detectors and which are related to a positioning target, wherein the n different target detectors may extract n different types of image features from the same image, and n is a positive integer equal to or greater than 2; obtaining an integrated detection frame on the basis of the n types of detection frames; each target detector extracting image features from an input image on the basis of the integrated detection frame to obtain n types of image features; performing image feature optimization on
(Continued)

S110: n types of detection boxes associated with an object to be positioned are acquired. Each type of detection boxes in the n types of detection boxes are determined by a respective one of n different object detectors, and each of the n different object detectors is capable of extracting a respective different type of image features from a same image, n being a positive integer equal to or greater than 2

S120: Integrated detection boxes are obtained based on the n types of detection boxes S130: Each of the n different object detectors extracts image features from an input image based on the integrated detection boxes to obtain n types of image features S140: Image feature optimization is performed based on the n types of image features to obtain optimized image features S150: Optimized detection boxes are obtained according to the optimized image features so as to detect the object the basis of the n types of image features to obtain optimized image features; and obtaining an optimized detection frame according to the optimized image features so as to detect a target.

18 Claims, 7 Drawing Sheets

(51) Int. Cl.
  *G06T 5/00* (2006.01)
  *G06T 7/20* (2017.01)
(52) U.S. Cl.
  CPC ...... *G06T 7/20* (2013.01); *G06T 2207/20024* (2013.01); *G06T 2207/20076* (2013.01); *G06T 2207/20221* (2013.01)

(56) References Cited

U.S. PATENT DOCUMENTS

| | | | |
|---|---|---|---|
| 10,839,581 B2* | 11/2020 | Chen | G06T 11/60 |
| 2012/0093407 A1 | 4/2012 | Mei | |
| 2013/0230245 A1 | 9/2013 | Matsumoto | |
| 2017/0061249 A1* | 3/2017 | Estrada | G06T 5/005 |
| 2017/0330059 A1* | 11/2017 | Novotny | G06K 9/00664 |
| 2019/0130580 A1* | 5/2019 | Chen | G06K 9/00711 |
| 2019/0244028 A1* | 8/2019 | Jones | G06N 3/0472 |
| 2020/0074178 A1* | 3/2020 | Guo | G06N 3/0454 |
| 2020/0074678 A1* | 3/2020 | Ning | G06T 7/73 |
| 2020/0175326 A1* | 6/2020 | Shen | G05D 1/0088 |

FOREIGN PATENT DOCUMENTS

| | | | |
|---|---|---|---|
| CN | 106529527 A | | 3/2017 |
| CN | 107292293 A | | 10/2017 |
| CN | 107301377 A | | 10/2017 |
| CN | 107527053 A | | 12/2017 |
| CN | 108009544 A | | 5/2018 |
| CN | 108154105 A | | 6/2018 |
| CN | 108171103 A | | 6/2018 |
| CN | 108229455 A | | 6/2018 |
| CN | 108288273 A | | 7/2018 |
| CN | 108985147 A | | 12/2018 |
| CN | 109145898 A | * | 1/2019 |
| CN | 109376637 A | | 2/2019 |
| CN | 109376681 A | | 2/2019 |
| CN | 110210474 A | | 9/2019 |

OTHER PUBLICATIONS

International Search Report in the international application No. PCT/CN2019/121773, dated Feb. 21, 2020, 2 pages.
Written Opinion of the International Search Authority in the international application No. PCT/CN2019/121773, dated Feb. 21, 2020, 11 pages.
Xingyu Zeng, etc., Gated Bi-directional CNN for Object Detection, ECCV2016, Dec. 31, 2016 (Dec. 31, 2016), p. 354-369.
Fang Luping, etc., Research overview of object detection methods, Computer Engineering and Applications, No. 13, vol. 54, Jul. 31, 2018 (Jul. 31, 2018), pp. 11-18,33.
First Office Action of the Chinese application No. 201910364565.0, dated Oct. 26, 2020, 11 pages.

* cited by examiner

TARGET DETECTION METHOD AND APPARATUS, DEVICE, AND STORAGE MEDIUM

CROSS-REFERENCE TO RELATED APPLICATIONS

This application is a continuation of International Application No. PCT/CN2019/121773, filed on Nov. 28, 2019, which is filed based upon and claims priority to Chinese patent application No. 201910364565.0, filed on Apr. 30, 2019. The contents of International Application No. PCT/CN2019/121773 and Chinese patent application No. 201910364565.0 are hereby incorporated by reference in their entireties.

TECHNICAL FIELD

The disclosure relates to, but is not limited to, the technical field of computer vision, and more particularly to a method, apparatus and device for object detection, and a computer storage medium.

BACKGROUND

Computer vision technologies usually relate to acquiring images and analyzing the acquired images to implement tracking of an object or behavioral analysis of the object. In some scenarios, the computer vision technologies also involve operations such as behavioral analysis based tracking and early warning of illegal behaviors.

In the computer vision technologies, a deep learning model is often used to perform object detection. However, problems that an object is lost or a wrong object is tracked may occur.

SUMMARY

In view of this, it is intended to provide a method, apparatus and device for object detection, and a computer storage medium in embodiments of the disclosure.

Provided in embodiments of the disclosure is a method for object detection, including: acquiring n types of detection boxes associated with an object to be positioned, each type of detection boxes being determined by a respective one of n different object detectors, wherein each of the n different object detectors is capable of extracting a respective different type of image features from a same image, n being a positive integer equal to or greater than 2; obtaining integrated detection boxes based on the n types of detection boxes; extracting, by each of the n different object detectors, image features from an input image based on the integrated detection boxes to obtain n types of image features; performing image feature optimization based on the n types of image features to obtain optimized image features; and obtaining optimized detection boxes according to the optimized image features so as to detect the object.

Further provided in embodiments of the disclosure is an apparatus for object detection, including: an acquisition module, configured to acquire n types of detection boxes associated with an object to be positioned, each type of detection boxes being determined by a respective one of n different object detectors, wherein each of the n different object detectors is capable of extracting a respective different type of image features from a same image, n being a positive integer equal to or greater than 2; an integration module, configured to obtain integrated detection boxes based on the n types of detection boxes; an extraction module, configured to enable each of the n different object detectors to extract image features from an input image based on the integrated detection boxes to obtain n types of image features; a first optimization module, configured to perform image feature optimization based on the n types of image features to obtain optimized image features; and a second optimization module, configured to obtain optimized detection boxes according to the optimized image features so as to detect the object.

Further provided in embodiments of the disclosure is a device for object detection, including: a memory, configured to store computer-executable instructions; and a processor, connected to the memory, and configured to implement, by executing the computer-executable instructions a method for object detection, the method including: acquiring n types of detection boxes associated with an object to be positioned, each type of detection boxes being determined by a respective one of n different object detectors, wherein each of the n different object detectors is capable of extracting a respective different type of image features from a same image, n being a positive integer equal to or greater than 2; obtaining integrated detection boxes based on the n types of detection boxes; extracting, by each of the n different object detectors, image features from an input image based on the integrated detection boxes to obtain n types of image features; performing image feature optimization based on the n types of image features to obtain optimized image features; and obtaining optimized detection boxes according to the optimized image features so as to detect the object.

A computer storage medium having computer executable instructions stored thereon, wherein the computer executable instructions, when executed by a processor, implement a method for object detection, the method including: acquiring n types of detection boxes associated with an object to be positioned, each type of detection boxes being determined by a respective one of n different object detectors, wherein each of the n different object detectors is capable of extracting a respective different type of image features from a same image, n being a positive integer equal to or greater than 2; obtaining integrated detection boxes based on the n types of detection boxes; extracting, by each of the n different object detectors, image features from an input image based on the integrated detection boxes to obtain n types of image features; performing image feature optimization based on the n types of image features to obtain optimized image features; and obtaining optimized detection boxes according to the optimized image features so as to detect the object.

A computer program product, including computer instructions, when called by a computer device, causes the computer device to execute the method of any above solution.

DETAILED DESCRIPTION

The technical solutions of the disclosure are further described below in detail in combination with the accompanying drawings and particular embodiments of the disclosure.

According to the method for object detection provided in the embodiments of the disclosure, detection boxes are obtained by using each of different object detectors. First of all, integration of detection boxes is performed to obtain the integrated detection boxes based on the detection boxes of the different object detectors, so that omission and wrong boxes are reduced compared with feature object tracking based on detection boxes of a single object detector. Then, at least two object detectors are used to extract at least two types of image features respectively based on the integrated detection boxes, and image feature optimization is performed based on the at least two types of image features, thereby reducing omission and error of image features. At last, optimized detection boxes are reversely deduced based on the optimized image features, so as to perform object tracking or object tracking-based object analysis based on the optimized detection boxes, reducing omission and error compared with any single object detector.

Figure 1:
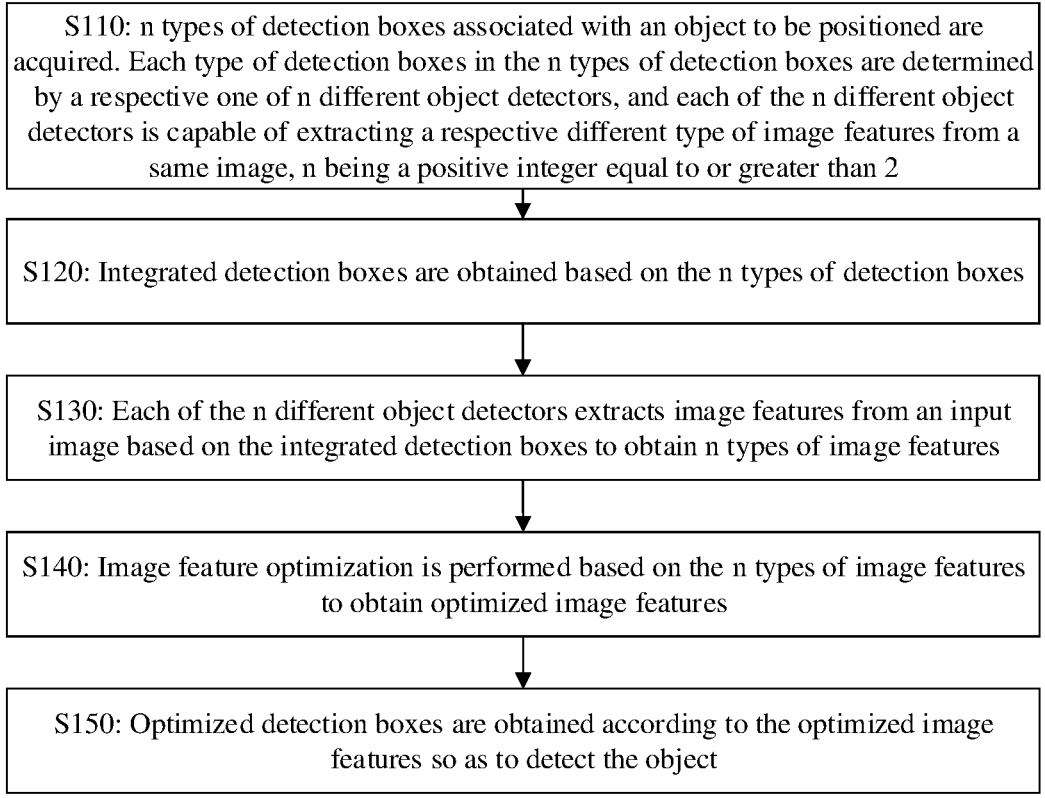
FIG. 1 illustrates a schematic flowchart of a method for object detection provided in embodiments of the disclosure.

As illustrated in FIG. 1, a method for object detection is provided in the embodiment. The method includes the following actions.

In S110: n types of detection boxes associated with an object to be positioned are acquired. Each type of detection boxes in the n types of detection boxes are determined by a respective one of n different object detectors, and each of the n different object detectors is capable of extracting a respective different type of image features from a same image, n being a positive integer equal to or greater than 2.

In S120: integrated detection boxes are obtained based on the n types of detection boxes.

In S130: each of the n different object detectors extracts image features from an input image based on the integrated detection boxes to obtain n types of image features.

In S140: image feature optimization is performed based on the n types of image features to obtain optimized image features.

In S150: optimized detection boxes are obtained according to the optimized image features so as to detect the object.

The method for object detection provided in the embodiment may be applied to a device running two object detectors each capable of extracting respective different image features from the same image.

The method for object detection may be applied to object tracking. For example, a movable robot determines a tracked person by executing the method for object detection, and then provides services, such as a shopping guide service, for the person. For another example, a carrier robot carries cargo or a person to a predetermined place. In some embodiments, the method for object detection may also be applied to motion tracking of a pedestrian on a road, and security protection is implemented based on a motion trace obtained by tracking.

Each object detector may extract a type of image features from an input image, and may obtain, when detecting the object by using the extracted image features, a type of detection boxes associated with the object to be positioned.

The object detector may be a deep learning model or machine learning model capable of extracting different image features from the same image.

For the n object detectors, n may be a positive integer no smaller than 2. The particular value of n may be 2, 3 or 4 or the like.

The n different object detectors may differ from one another in any of the following aspects: neural networks corresponding to the n different object detectors are different in network structures; the neural networks corresponding to the n different object detectors are different in network parameters; model algorithms followed by the n different object detectors are different from one another; the n different object detectors extract detection boxes in respective different ways; and the n different object detectors extract image features in respective different ways.

To sum up, in the embodiment, even the n object detectors need to acquire the same type of result for the same input image, the different object detectors may need to perform processing based on different features of the images due to different attributes and/or parameters of the object detectors. In this way, advantages of one object detector may make compensate for defects of other object detectors to optimize a final object detection result.

In order to solve the problem of low accuracy in a single object detector positioning and/or analyzing an object from an input image, n object detectors are used at the same time to obtain corresponding detection boxes respectively in the embodiment.

The detection boxes detected by the n object detectors may all be rectangular boxes, and are regions in the input image considered as containing the object directly or indirectly given by the n object detectors respectively.

In the embodiment, each of the object detectors can extract a respective type of image features from the input image.

In the embodiment, the n types of object detectors may have respective different detection functions, for example different types of image features may be extracted.

The object may be classified into various types of moving objects. The moving objects include but are not limited to living bodies or non-living bodies. Typical living bodies include but are not limited to: humans and/or animals. Non-living bodies may include such as various vehicles and/or self-movable robots.

In S120, integration is performed based on the detection boxes of the n object detectors. Herein, the integration includes but is not limited to: merging of detection boxes of different object detectors. Thus, the integrated detection boxes on one hand may reduce object lost caused by omission in detecting with a single object detector, and may reduce object lost resulted from that regions containing the object in the input image are not enclosed by the detection boxes due to a positioning error occurred to the single object detector.

Specifically, S120 may include but is not limited to the following operations. A union set of the detection boxes output by the n object detectors is acquired to obtain the integrated detection boxes. A union set of detection boxes of which corresponding first probability values are ranked in a large-to-small order at top M1% among all detection boxes of some object detector, and detection boxes of the other object detectors is acquired to obtain the integrated detection boxes.

M1 is a positive integer smaller than 100. For example, M1 may be 50, 60 or the like.

When feature detection is performed in S130, instead of directly extracting image features based on detection boxes obtained by each object detector itself, the object detectors extract respective corresponding image features from the input image based on the integrated detection boxes.

For instance, it is supposed that that n=2, and the n object detectors include: a first object detector and a second object detector. The first object detector outputs a first type of detection boxes, and a second object detector outputs a second type of detection boxes. It is further supposed that the first type of detection boxes includes S1 detection boxes, and the second type of detection boxes includes S2 detection boxes. S3 integrated detection boxes are obtained after the first type of detection boxes and the second type of detection boxes are merged or the like.

S3 is smaller than or equal to a sum of S1 and S2. S3 is greater than or equal to the S1, or S3 is greater than or equal to the S2.

In S130, the first object detector extracts, according to positions of the S3 integrated detection boxes in the input image, the first type of image features in the image regions enclosed by the integrated detection boxes respectively, and the second object detector extracts, according to the S3 integrated detection boxes, the second type of image features in the image regions enclosed by the integrated detection boxes respectively.

In the embodiment, the first type of image features and the second type of image features are different types of features, and differences lie in the following. The first type of image features and the second type of image features are extracted by different models respectively. Feature values in the first type of image features and feature values in the second type of the image features correspond to different attributes of the image. For example, some type of image features describe conditions of color distribution, and some type of image features describe conditions of brightness distribution. For another example, some type of image features describe appearance information of an image object, and some type of image features describe structure information of the image object.

In short, the first type of image features and the second type of image features are different types of image features.

In the embodiment, after the first type of image features and the second type of image features are obtained, the two types of image features are further combined to obtain optimized image features. Herein, in the optimized image features, feature values in the two types of image features can be introduced, and/or, at least the phenomenon that the description of the object by a single image feature is not sufficiently accurate or is wrong is reduced.

In the embodiment, S140 may include that: image features obtained by respective ones of the n object detectors based on the integrated detection boxes are fused.

The fusion includes linear fusion and nonlinear fusion.

The linear fusion is to fuse, by using a fusion algorithm that can be converted into a linear function, the n types of image features to obtain linearly optimized image features. Typical linear functions include but are not limited to: an equal proportion function and the like.

The non-linear fusion is to fuse, by using a fusion algorithm that can be converted into no linear function, the n types of image features to obtain non-linearly optimized image features. Typical nonlinear functions may include: a piecewise function and/or a convolution function including convolution operation.

For instance, the foregoing embodiment is continued, and description is made with n=2 as an example. The first type of image features output by the first object detector and the second type of image features output by the second object detector may be fused as follows.

The first type of image features and the second type of image features are linearly fused to obtain linearly optimized image features. The first type of image features and the second type of image features are nonlinearly fused to obtain nonlinearly optimized image features.

The first type of image features and the second type of image features are concatenated to obtain a first type of concatenated features. During the concatenation, for example, the first type of image features are W1*H1*C1 image features, and the second type of image features are W2*H1*C1 image features; then the first type of concatenated features may be (W1+W2)*H1*C1 image features.

The first type of image features are further processed so as to be converted into image features that may be concatenated with the second type of image features to obtain a second type of concatenated features.

In still some embodiments, S140 may include the following operations. A first confidence of a feature value at an $m^{th}$ position in the first type of image features is compared with a second confidence of a feature value at an $m^{th}$ position in the second type of image features.

If the first confidence is greater than the second confidence, the feature value at the $m^{th}$ position in the first type of image features is used as a feature value at an $m^{th}$ position in the optimized image features.

If the second confidence is greater than or equal to the first confidence, the feature value at the $m^{th}$ position in the second type of image features is used as the feature value at the $m^{th}$ position in the optimized image features.

In some embodiments, the optimized image features may be obtained using the following functional relationships in S130:

$F_m^{cur1}=f_1(F_m^0)\oplus F_m^{old1}$, where $F_m^{cur1}$ is the first type of image features obtained after the optimization in the $m^{th}$ time of execution, $F_m^0$ is the first type of image features extracted by the first object detector before the optimization in the $m^{th}$ time of execution, $F_m^{old1}$ is the second type of image features extracted by the second object detector in the $m^{th}$ time of execution, and $f_1$ is a first optimization function; or $F_m^{cur0}=f_2(F_m^1)\oplus F_m^{old0}$, where $F_m^{cur0}$ is the second type of image features obtained after the optimization in the $m^{th}$ time of execution, $F_m^1$ is the second type of image features extracted by the second object detector before the optimization in the $m^{th}$ time of execution, $F_m^{old0}$ is the first type of image features extracted by the first object detector in the $m^{th}$ time of execution, and $f^2$ is a second optimization function.

The above is merely an example of obtaining the optimized image features based on the first type of image features and the second type of image features. There are a variety of implementations in particular, and examples will not be enumerated here.

To sum up, as the optimized image features are obtained based on two different types of image features, lost or wrong features of the object occurred when a single object detector is used to extract image features may be reduced, the phenomenon that the object is lost or is falsely tracked may be reduced, and the accuracy of object tracking and/or object analysis may be improved.

In some embodiments, after the optimized image features are obtained, detection boxes are reversely deduced based on the optimized image features, that is, obtaining the optimized detection boxes.

For example, the optimized image features are used as input of a regressor to obtain information of detection boxes output by the regressor. At this time, the obtained detection boxes are the optimized detection boxes. Compared with the first type of detection boxes directly extracted by the first object detector and/or the second type of detection boxes directly extracted by the second object detector, the probability that the optimized detection boxes containing the tracked object is greatly improved. By using the method for object detection provided in the embodiment, the tracked object can be accurately tracked even partially occluded and/or quickly moving. A high tracking success rate may be achieved, and the accuracy and robustness of object detection are improved.

In some embodiments, S140 may include the following operations. When the method is executed for an $m^{th}$ time, a $p^{th}$ type of image features in the n types of image features are optimized by using n-1 types of image features in the n types of image features, to obtain the optimized image features. The $p^{th}$ type of image features are a type of image features in the n types of image features other than the n-1 types of image features. m is an integer greater than 0, and p is an integer greater than 0 and smaller than or equal to n.

In the embodiment of the disclosure, the success rate of object tracking can be improved by executing S110 to S150 only once. However, in the embodiment, in order to further improve the tracking effect, the method in the embodiment is executed for multiple times to implement multiple times of optimization.

Therefore, in the embodiment, m may be a positive integer. Each time of image feature optimization, one object detector may be randomly selected from the n object detectors, so that the image features extracted by the object detector or the optimized image features corresponding to the object detector are optimized.

For realizing the optimization effect, each type of image features may be optimized sequentially according to a certain sequence, such as a sequence of p=mod(m/n)+1, to obtain the corresponding type of optimized image features.

For example, if n=2, in the first time, the second type of image features are used to optimize the first type of image features extracted by the first object detector to obtain the optimized image features; and in the second time, the optimized image features are used to optimize the second type of image features extracted by the second object detector.

If n=3, the optimization may be executed for 2, 3 or more times. In the first time, the second type of image features (extracted by the second object detector) and the third type of image features (extracted by the third object detector) are used to optimize the first type of image features extracted by the first object detector, to obtain optimized image features; and in the second time, the optimized image features obtained in the first time and the third type of image features are used to optimize the second type of image features extracted by the second object detector, to obtain optimized image features in the second time. In some embodiments, if a third time of optimization is needed, the optimized image features obtained in the first time and the optimized image features obtained in the second time are used to optimize the third type of image features.

In some embodiments, S140 may further include the following operations. Convolution is performed on each type of image features in the n-1 types of image features to obtain convolutional features for each type of image features in the n-1 types of image features. The $p^{th}$ type of image features in the n types of image features are optimized by using the convolutional features, to obtain the optimized image features.

In the embodiment, n types of image features are extracted by convolution which is non-linear calculation, for mutual complementation among the n types to optimize the image features, which has a better effect compared with linear calculation based feature fusion.

In particular, the convolution may be implemented by a convolutional channel that connects different object detectors.

In some embodiments, the operation that convolution is performed on each type of image features in the n-1 types of image features to obtain the convolutional features for each type of image features in the n-1 types of image features may specifically include the following operations.

First convolution is performed on each type of image features in the n-1 types of image features to obtain n-1 types of first convolutional features. Each type of first convolutional features in the n-1 types of first convolutional features are activated to obtain n-1 types of activated features. Second convolution is performed on each type of activated features in the n-1 types of activated features to obtain the convolutional features for each type of image features in the n-1 types of image features.

That is, convolution is firstly performed on each type of image features in the n-1 types of image features once, then a convolution result is activated and another time of convolution is performed on an activation result.

In the embodiment, the first convolution and the second convolution may be the same or different convolution.

For instance, description is made with n=2 as an example. The operations that convolution is performed on each type of image features in the n-1 types of image features to obtain the convolutional features for each type of image features in the n-1 types of image features, and the $p^{th}$ type of image features in the n types of image features are optimized by using the convolutional features, to obtain the optimized image features may include that:

convolution is performed on the first type of image features by using a convolutional transmission channel, to obtain a first type of convolutional features, and the second type of image features are optimized by using the first type of convolutional features, to obtain a second type of optimized image features; or convolution is performed on the second type of image features by using a convolutional transmission channel, to obtain a second type of convolutional features, and the first type of image features are optimized by using the second type of convolutional features, to obtain a first type of optimized image features.

In the embodiment, when the first type of image features and the second type of image features are fused to obtain the optimized image features, the convolutional transmission channel is preferentially used to perform the convolution, and nonlinear fusion of the first type of image features and the second type of image features is realized.

In the embodiment, the convolutional transmission channel is a transmission channel containing a convolutional operation. If the image features are transmitted through the convolutional transmission channel, image features entering the convolutional transmission channel are output after subjecting to the convolutional operation at least once.

In the embodiment, the convolutional transmission channel is used to perform convolution on the first type of image features to obtain the first type of convolutional features, and the first type of convolutional features are used to optimize the second type of image features to obtain the optimized image features. The optimized image features obtained at this time are the second type of optimized image features.

In the embodiment, the convolutional transmission channel may be used to perform convolution on the first type of image features for one or more times to obtain the first type of convolutional features.

Likewise, the convolutional transmission channel may also be used perform convolution on the second type of image features for one or more times to obtain the second type of convolutional features.

In some embodiments, convolution is performed on the first type of image features and the second type of image features by using the same convolutional transmission channel. As such, the first type of image features may share the same convolutional transmission channel with the second type of image features, thereby simplifying the model structure of the deep learning model or the machine learning model.

In the embodiment, two types of image features are extracted by convolution, which is non-linear calculation, for mutual complementation between the two types to optimize the image features, which has the better effect compared with linear calculation based feature fusion.

The convolutional channel in the above embodiment may include: a first convolution layer, an activation layer and a second convolution layer.

The first convolution layer is configured to perform first convolution on input image features to obtain first convolutional features, the input image features being the first type of image features or the second type of image features.

The activation layer is connected to the first convolution layer, and is configured to activate the first convolutional features to obtain activated features.

The second convolution layer is connected to the activation layer, and is configured to perform second convolution on the activated features to obtain the first type of convolutional features or the second type of convolutional features.

In the embodiment, the first convolution layer performs convolution on the input image features. Here, a convolution kernel of the first convolution layer may be a 1*1 convolution kernel. Hence, after the input image features are processed by the first convolution layer, the output first convolutional features have the same dimensions as the input image features.

The activation layer may be a network layer configured according to various types of activation functions. In the embodiment, the activation layer may be a network layer provided by a Rectified Linear Unit (ReLU).

Feature mapping is performed on the first convolutional features by the ReLU to obtain the activated features to be input to the second convolution layer.

The second convolution layer may have a convolution kernel same as or different from that of the first convolution layer. In the embodiment, the convolution kernel of the second convolution layer may also be a 1*1 convolution kernel. Hence, the dimensionality of the second type of convolutional features obtained by the second convolution of the second convolution layer also keeps unchanged compared with the dimensionality of the input features input to the second convolution layer.

For example, the dimensionality of the second type of convolutional features may keep consistent with the dimensionality of the image features to be optimized thereby.

Figure 2A:
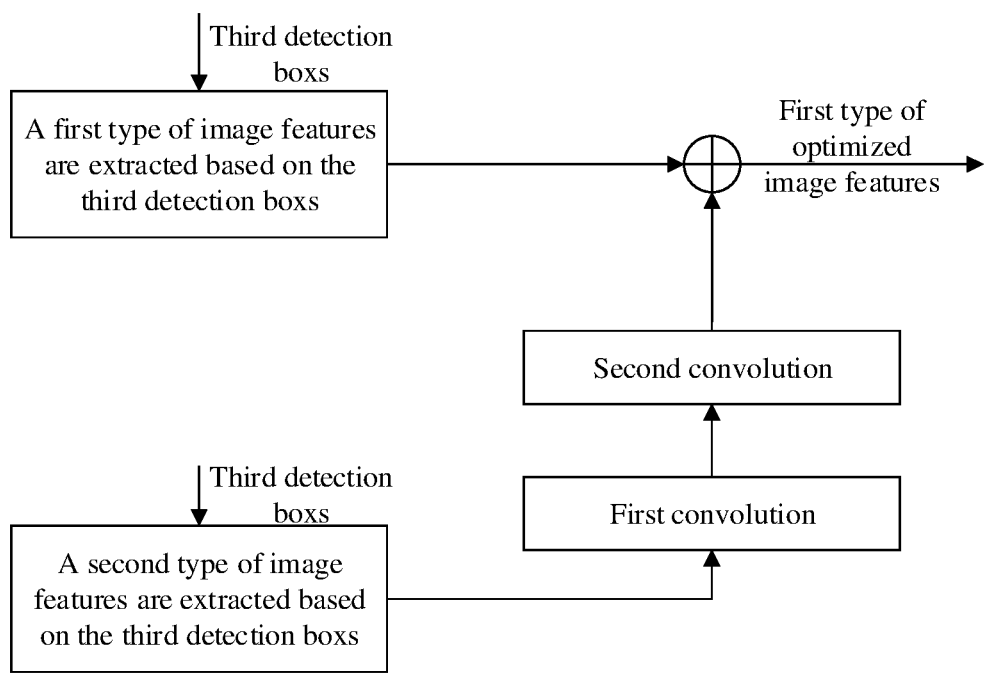
FIG. 2A illustrates a schematic diagram of optimizing a first type of image features by using a second type of image features provided in embodiments of the disclosure.

FIG. 2A illustrates a schematic diagram of obtaining optimized image features based on a first type of image features and a second type of image features. In FIG. 2A, after subjecting to convolution in the convolutional transmission channel, the second type of image features are concatenated with the first type of image features to obtain the optimized image features, i.e., the first type of optimized image features.

Figure 2B:
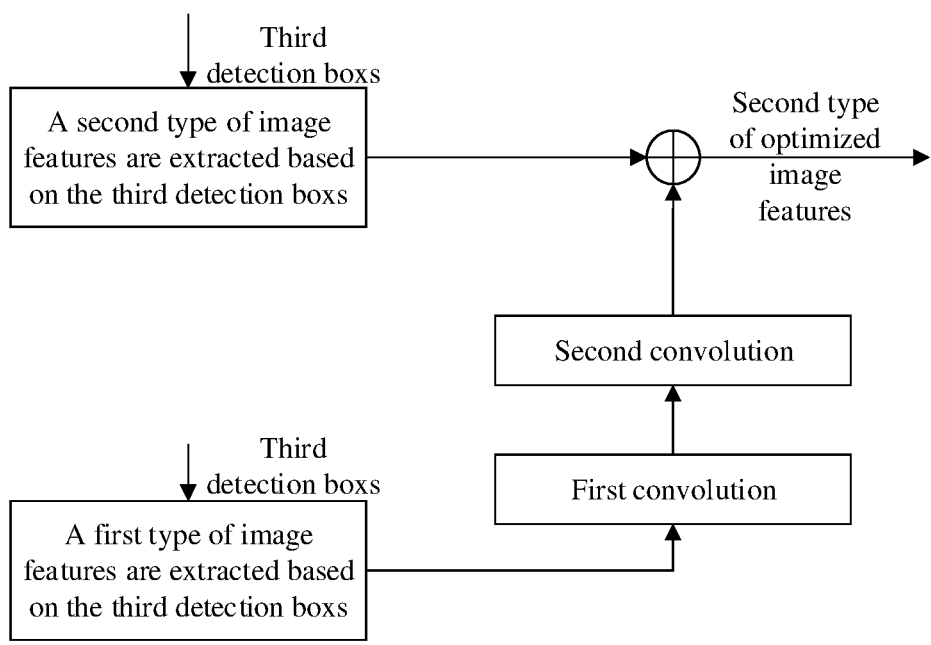
FIG. 2B illustrates a schematic diagram of optimizing a second type of image features by using a first type of image features provided in embodiments of the disclosure.

FIG. 2B illustrates another schematic diagram of obtaining optimized image features based on a first type of image features and a second type of image features. In FIG. 2B, after subjecting to convolution in the convolutional transmission channel, the first type of image features are concatenated with the second type of image features to obtain the optimized image features, i.e., the second type of optimized image features.

The first object detector determines first detection boxes, and the second object detector determines second detection boxes. The first detection boxes and the second detection boxes are integrated to obtain third detection boxes. The first object detector extracts a first type of image features from the input image according to the third detection boxes, and the second object detector extracts a second type of image features from the input image according to the third detection boxes.

The convolutional channel may also be configured to perform convolution on the n-1 types of image features when n is 3 or a greater number.

In some embodiments, S150 may include that regression is performed based on the optimized image features to obtain the optimized detection boxes.

In the embodiment, based on a mutual dependency relationship of the optimized image features with detection boxes, the optimized detection boxes may be obtained by regression such as reverse deduction.

In the embodiment, there are a variety of ways to obtain the optimized detection boxes. Herein, a simply implementable way is provided, and a particular implementation process is not limited to the embodiment.

An example is given with n=2. S150 may include that: a first type of optimized detection boxes are obtained based on a first type of optimized image features; or, a second type of optimized detection boxes are obtained based on a second type of optimized image features.

In the embodiment, if the second type of image features are used to optimize (i.e., enhance) the first type of image features to obtain the first type of optimized image features in S140, the first type of optimized detection boxes are obtained correspondingly in S150. If the first type of image features are used to optimize (i.e., enhance) the second type of image features to obtain the second type of optimized image features in S140, the second type of optimized detection boxes are obtained correspondingly in S150.

Therefore, in the embodiment, the optimized detection boxes may be divided into two types: the first type of optimized detection boxes, and the second type of optimized detection boxes.

The first type of detection boxes are determined by the first object detector, and the second type of detection boxes are determined by the second object detector.

In some embodiments, S120 may further include that: detection boxes, each having a probability value no smaller than a probability threshold, in each type of detection boxes in the n types of detection boxes are merged to obtain integrated detection boxes.

Hence, the probability value may be a probability that the object is accurately enclosed by the detection boxes, and is a confidence value.

In the embodiment, by comparison with the probability threshold, merging is performed after filtering away detection boxes of which probability values are smaller than the probability threshold. The phenomenon that the boxes with low probability values are added to the integrated detection boxes may be reduced, detection of unnecessary image features based on the integrated detection boxes in S140 is reduced, and unnecessary calculation amount is reduced.

In some embodiments, the probability thresholds for detection boxes output by different object detectors may be equal or unequal. For instance, with n=2 as an example, the probability thresholds corresponding to the detection boxes output by the two object detectors respectively may both be 0.5, 0.6 or the like, and may also be the case that one is 0.5 and the other is 0.6.

Description is made still with n=2 as an example. S120 may specifically include:

the second type of detection boxes are merged with detection boxes, each having a first probability value greater than a first probability threshold, among a first type of detection boxes, to obtain the integrated detection boxes, the first probability value being a probability value that a first type of detection box contains the object; or the first type of detection boxes are merged with detection boxes, each having a second probability value greater than a second probability threshold, among a second type of detection boxes, to obtain the integrated detection boxes, the second probability value being a probability value that a second type of detection box contains the object.

In the embodiment, the first probability values are output by the first object detector synchronously as outputting the first type of detection boxes, and the second probability values are output by the second object detector synchronously as outputting the second type of detection boxes.

In the embodiment, in order to reduce unnecessary merging, a portion of detection boxes having higher probability values in the second type of detection boxes are merged with the first type of detection boxes. The merging herein includes, but not limited to, solving a union set to obtain the integrated detection boxes. Hence, on one hand, by comparing the first probability values with the first probability threshold, a portion of detection boxes having lower probability values of containing the object in the first type of detection boxes are removed, and the removal of the portion of detection boxes has no negative impact or has no much negative impact on the reinforcement of the second type of detection boxes. On the other hand, the number of integrated detection boxes is reduced, such that the unnecessary calculation amount may be reduced in the subsequent image feature extraction process in S140, the calculation efficiency may be improved, and the calculation resources may be saved. Likewise, if the integrated detection boxes are obtained by using detection boxes, each having a first probability value greater than the first probability threshold, in the first type of detection boxes, the above characteristic also exists.

In some embodiments, when the integrated detection boxes are obtained based on the first type of detection boxes and the second type of detection boxes in S120, a Non-Maximum Suppression (NMS) algorithm may be used. Detection boxes, of which probability values are a maximum value, in different image regions of the input image are extracted by using a slide window, and are merged with detection boxes extracted by another object detector to obtain the integrated detection boxes. For example, a portion of detection boxes are selected from the first type of detection boxes by using the NMS algorithm and are merged with all the second type of detection boxes to obtain the integrated detection boxes; or, a portion of detection boxes are selected from the second type of detection boxes by using the NMS algorithm and are merged with all the first type of detection boxes to obtain the integrated detection boxes.

To sum up, there is more than one way to obtain the integrated detection boxes based on the first type of detection boxes and the second type of detection boxes in S120, and the particular implementation is not limited to the above example.

In some embodiments, through the operation of mutual reinforcement between the two object detectors, the accuracy of object tracking or object analysis can still be improved compared with a single object detector, even the mutual reinforcement is performed once.

In some other embodiments, in order to further improve the accuracy and robustness of object tracking or object analysis, the mutual reinforcement between the first object detector and the second object detector is iterated for multiple times, i.e., the method provided in the embodiment of the disclosure is executed for multiple times. Herein, the iteration may be executed in multiple times, and each time of execution may include that: a first type of detection boxes and a second type of detection boxes are merged to obtain integrated detection boxes; two types of image features are extracted based on the integrated detection boxes; optimized image features are obtained; and optimized detection boxes are determined.

With n=2 as an example, when the method provided in the embodiment of the disclosure is executed for multiple times, S110 may include that: if the method provided in the embodiment of the disclosure is executed for a first time, the first object detector is used to detect the object in the input image to obtain the first type of detection boxes, and the second object detector is used to detect the object in the input image to obtain the second type of detection boxes.

When the method provided in the embodiment of the disclosure is executed for the first time, the first type of detection boxes are obtained from the input image by the first object detector through detection, and the second type of detection boxes are obtained from the input image by the second object detector through detection.

Hence, in the first time of execution, the first type of detection boxes and the second type of detection boxes are detection boxes having not been optimized.

Correspondingly, in S120, the integrated detection boxes are obtained by directly merging different types of detection boxes respectively output by the first object detector and the second object detector, or by merging the two types of detection boxes based on a comparison result of comparing a probability value with a probability threshold.

In some embodiments, for example, the first object detector and the second object detector may be different processing branches of a quick Regional Convolutional Neural Network (R-CNN). The R-CNN may be a regional convolutional neural network. Proposal regions obtained by the first branch corresponding to the first object detector through detection are the first type of detection boxes, and proposal regions obtained by the second branch corresponding to the second object detector through detection are the second type of detection boxes.

When the n is an integer greater than 1, and the method is executed for a first time, S110 may include that: the n different object detectors are respectively used to detect the object in the input image to obtain the n types of detection boxes associated with the object to be positioned.

At this time, the detection boxes for optimization are all obtained by the object detectors through detection.

In some embodiments, when the method is executed for a $k^{th}$ time, k being an integer greater than 1, the operation that the n types of detection boxes associated with the object to be positioned are acquired, each type of detection boxes in the n types of detection boxes being determined by a respective one of the n different object detectors may include that: for each of the n different object detectors, detection boxes determined by the object detector when the method is executed for a $(k-1)^{th}$ time or optimized detection boxes corresponding to the object detector are acquired.

If the $k^{th}$ time of execution is not the first time of execution, detection boxes of at least one object detector are optimized detection boxes obtained through a previous time of execution.

Still with n=2 as an example, as iterative optimization is used in the embodiment to obtain detection boxes that have been optimized iteratively for multiple times, in some embodiments, S110 may include that: if the current execution is a $k^{th}$ time of execution, a first type of detection boxes obtained by the first object detector through detection or optimization in a $(k-1)^{th}$ time of execution are acquired, and a second type of detection boxes obtained by the second object detector through detection or optimization in a $(k-1)^{th}$ time are acquired. k is a positive integer equal to or greater than 2.

For example, if the current execution is a second time of execution, the first type of detection boxes acquired in S110 are detection boxes obtained by detection or optimization when the method provided in the embodiment of the disclosure is executed for a first time; and the second type of detection boxes acquired are detection boxes obtained by optimization or detection in the first time of execution.

Specifically for example, if the optimized detection boxes obtained through the first time of execution are the first type of optimized detection boxes, then, the first type of detection boxes acquired in S110 during the second time of execution are the first type of optimized detection boxes obtained in the first time of execution; and the second type of detection boxes acquired in S110 during the second time of execution are still the second type of detection boxes directly detected by the second object detector from the input image in the first time of execution.

If the optimized detection boxes obtained through the first time of execution are the second type of optimized detection boxes, then the second type of detection boxes acquired in S110 during the second time of execution are the second type of optimized detection boxes obtained in the first time of execution; and the first type of detection boxes acquired in S110 during the second time of execution are still the first type of detection boxes directly detected by the first object detector from the input image in the first time of execution.

For another example, when the method provided in the embodiment of the disclosure is executed for a $k^{th}$ (k is greater than 2) time at present, the first type of detection boxes acquired in S110 are detection boxes obtained by detection or optimization in a $(k-1)^{th}$ time of execution; and the second type of acquired detection boxes are detection boxes obtained by optimization or detection in the $(k-1)^{th}$ time of execution.

Specifically for example, during the third time of execution, the first type of detection boxes acquired in S110 are the first type of optimized detection boxes obtained in the first time of execution, and the second type of detection boxes acquired are the second type of optimized detection boxes obtained in the second time of execution; or, during the third time of execution, the first type of detection boxes acquired in S110 are the first type of optimized detection boxes obtained in the second time of execution, and the second type of detection boxes acquired are the second type of optimized detection boxes obtained in the first time of execution.

As such, by executing the method for object detection provided in the embodiment of the disclosure for multiple times, the detection boxes are gradually optimized.

In some embodiments, the number of execution times may be at least two, and may specifically be an even number. Therefore, during the multiple times of execution, the crossed iterative optimization of the first type of detection boxes with the second type of detection boxes is implemented to further improve the optimization effect of the detection boxes.

In some embodiments, if all the current first type of detection boxes and second type of detection boxes are optimized detection boxes obtained through the preceding execution, a union set of the first type of detection boxes and the second type of detection boxes is directly solved in S120 to obtain the optimized and integrated detection boxes.

In some embodiments, S130 may include that: if the first type of image features are used to optimize the second type of image features in the previous time of execution, the second type of image features are used to optimize the first type of image features in this time of execution.

In order to implement crossed iterative reinforcement between different models in the embodiment, if the first type of image features are used to optimize the second type of image features in the previous time of execution, the second type of image features are used to optimize the first type of image features in this time of execution. The phenomenon that some image features are easily lost after multiple times of processing due to that one same object detector is used to reinforce the other object detector in multiple times of execution is reduced, and the iterative optimization effect for the image features and detection boxes are further improved.

For example, if the first type of image features are used to reinforce (i.e., optimize) the second type of image features in a $(2*p-1)^{th}$ time of execution, the second type of image features are used to reinforce (i.e., optimize) the first type of image features in a $(2*p)^{th}$ time of execution. Herein, p is a positive integer. Thus, the crossed iterative optimization of image features between different models is implemented.

With the crossed iterative optimization of image features between the different models, the crossed iterative optimization of detection boxes may be implemented between the different models.

In some embodiments, the first type of image features are color image features, and the second type of image features are optical flow image features; or, the first type of image features are optical flow image features, and the second type of image features are color image features.

In some other embodiments, at least two types among the following may also be used for the crossed iterative optimization: color image features, optical flow image features, depth image features and image segmentation features.

Specifically for example, the color image features may be Red Green Blue (RGB) features or Luma and Chroma (YUV) features. The color image features here may be an RGB or YUV color histogram or the like, and only appearance information of the object is kept, for example, information of five sense organs in human body imaging is kept.

The optical flow image features may be optical flow image features extracted from the image by an optical flow algorithm. The optical flow image features here are motion features characterizing motion conditions of a surface and/or edge of the object are extracted based on the characteristic that a moving object keeps unchanged in short time and/or keeps an unchanged speed vector field in neighboring regions.

In the embodiment, with mutual reinforcement of the color image features with the optical flow image features, the error caused due to that only color image features or optical flow image features are used in object tracking or object analysis during the object tracking is reduced, and the accuracy of object tracking and/or object analysis is improved.

Figure 3:
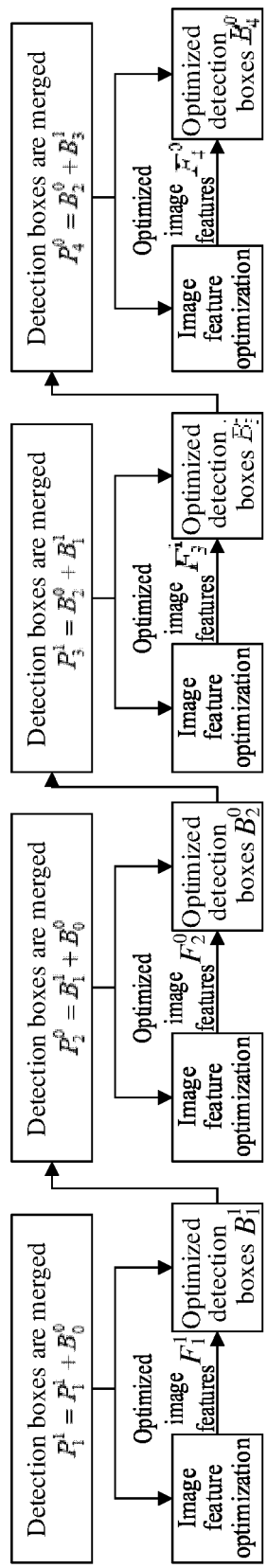
FIG. 3 illustrates a schematic diagram of iterative optimization provided in embodiments of the disclosure.

Referring to FIG. 3, the iteration may include four times of execution. Each time of execution includes: merging detection boxes, optimizing image features based on the integrated detection boxes, and obtaining optimized detection boxes based on optimized image features.

In merging detection boxes in the first time of execution, the function $P_1^1=P_1^1+B_0^0$ is used. $P_1^1$ on the right side of the equation is the first type of detection boxes extracted by the first object detector from the input image. $B_0^0$ is the second type of detection boxes extracted by the second object detector from the input image. $P_1^1$ on the left side of the equation is integrated detection boxes obtained through the first time of execution. After two types of image features are respectively obtained based on the integrated detection boxes, feature optimization is performed to obtain a first type of optimized image features $F_1^1$. Then, based on regression of the first type of optimized image features $F_1^1$, a first type of optimized detection boxes $B_1^1$ in the first time of execution are obtained in some embodiments.

In merging detection boxes in the second time of execution, the function $P_2^0=B_1^1+B_0^0$ is used. $B_1^1$ is the first type of optimized detection boxes obtained in the first time of execution. $B_0^0$ is the second type of detection boxes extracted by the second object detector from the input image. $P_2^0$ is integrated detection boxes obtained in the second time of execution. After two types of image features are respectively obtained based on the integrated detection boxes $P_2^0$, feature optimization is performed to obtain a second type of optimized image features $F_2^0$. Then, based on regression of the second type of optimized image features $F_2^0$, a second type of optimized detection boxes $B_2^0$ in the second time of execution are obtained in some embodiments.

In merging detection boxes in the third time of execution, the function $P_3^1=B_2^0+B_1$ is used. $B_2^0$ is the second type of optimized detection boxes obtained in the second time of execution. $B_1^1$ is the first type of optimized detection boxes obtained in the first time of execution. $P_3^1$ is integrated detection boxes obtained in the third time of execution. After two types of image features are respectively obtained based on the integrated detection boxes $P_3^1$, feature optimization is performed to obtain a first type of optimized image features $F_3^1$. Then, based on regression of the first type of optimized image features $F_3^1$, a first type of optimized detection boxes $B_3^1$ in the third time of execution are obtained in some embodiments.

In merging detection boxes in the fourth time of execution, the function $P_4^0=b_2^0+B_3^1$ is used. $B_3^1$ is the first type of optimized detection boxes obtained in the third time of execution. $B_2^0$ is the second type of optimized detection boxes obtained in the second time of execution. $P_4^0$ is integrated detection boxes obtained in the fourth time of execution. After two types of image features are respectively obtained based on the integrated detection boxes $P_4^0$, feature optimization is performed to obtain a second type of optimized image features $F_4^0$. Then, based on regression of the second type of optimized image features $F_4^0$, a second type of optimized detection boxes $B_4^0$ in the fourth time of execution are obtained in some embodiments.

In some embodiments, the method further includes that: optimized detection boxes for a plurality of image frames in a video are connected to form an action pipeline of the object; and the object is tracked based on the action pipeline.

In the embodiment, the action pipeline may be formed by sorting detection boxes based on a temporal order.

For example, the video includes T frames. In an order of the 1st frame to the $T^{th}$ frame, optimized detection boxes corresponding to the same object are sorted to obtain the action pipeline.

As such, based on the action pipeline, image features needed are extracted from the 1st frame to the $T^{th}$ frame for object tracking. Alternatively, calculations are made directly based on image coordinates and/or occupied image areas, characterized in the action pipeline, of the same object in the input image, to implement the object tracking.

For example, for a static camera, if the depth of field of the camera keeps unchanged, the smaller the distance from the object to the camera, the larger the occupied image area in the corresponding image frames; and the larger the distance from the object to the camera, the smaller the occupied image area in the corresponding image frames. There are a variety of manners to express an optimized detection box, and two optional manners are provided hereinafter.

The optimized detection box is expressed by using coordinates of four vertexes of the optimized detection box in an image coordinate system.

The optimized detection box is expressed by using coordinates of a central point of the optimized detection box in the image coordinate system, a length of the optimized detection box, and a width of the optimized detection box.

The area of the optimized detection box is directly proportional to the area occupied by the object in the image.

As such, the change in the distance between the camera and the object may be estimated through the image area, so as to determine the moving speed of the object and further implement the object tracking.

In some other embodiments, as the optimized detection boxes in the action pipeline have defined positions of the object in the corresponding image frames, when the behavioral analysis of the object is performed, the image features may be extracted from the corresponding image frames according to the optimized detection boxes for the behavioral analysis of the object.

For example, in the field of road traffic, such a manner may be used to perform road behavioral analysis of pedestrians and road behavioral analysis of vehicles to monitor whether the pedestrian or vehicle has an illegal behavior.

Figure 4:
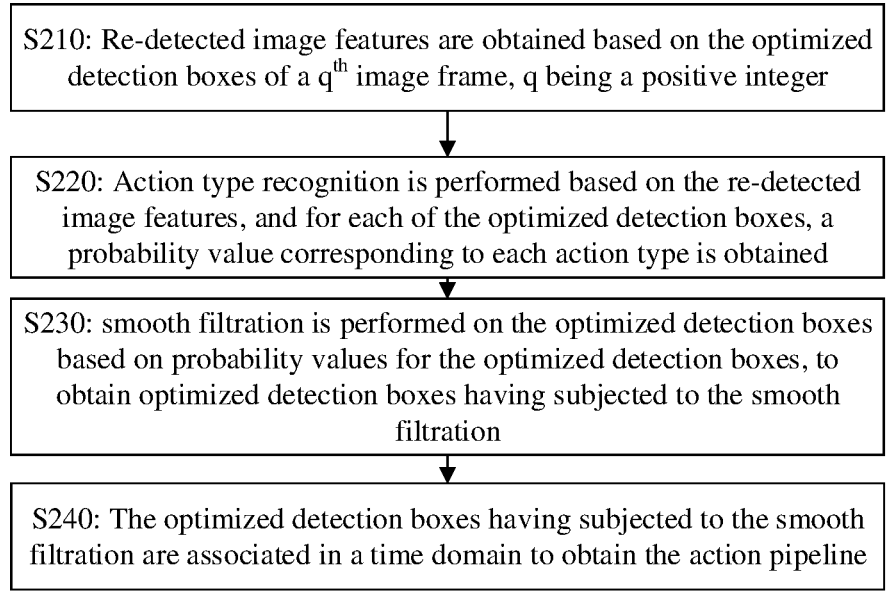
FIG. 4 illustrates a schematic diagram of forming an action pipeline by connection provided in embodiments of the disclosure.

In some embodiments, as illustrated in FIG. 4, the operation that the optimized detection boxes for the plurality of image frames in the video are connected to form the action pipeline of the object may include the following S210-S240.

In S210: re-detected image features are obtained based on the optimized detection boxes of a qt image frame, q being a positive integer.

In S220: action type recognition is performed based on the re-detected image features, and for each of the optimized detection boxes, a probability value corresponding to each action type is obtained.

In S230: smooth filtration is performed on the optimized detection boxes based on probability values for the optimized detection boxes, to obtain optimized detection boxes having subjected to the smooth filtration.

In S240: the optimized detection boxes having subjected to the smooth filtration are associated in a time domain to obtain the action pipeline.

The re-detected image features in the embodiment may be different from all of the above n types of image features, or may be the same with one or more of the above n types of image features. For example, the re-detected image features may also be optical flow image features or color image features.

Specifically for example, in S220, a binary classifier is used to determine, through action classification, whether the object executes a predetermined action in the corresponding image frames, for example whether a vehicle performs a classification of illegal actions such as running a red light or pressing a line is recognized in the field of traffic roads. The action type recognition may include: judging whether an action is an illegal action or a legal action.

Specifically for another example, in S220, multiple classifiers may be used to recognize multiple types of actions. A classifier is used to recognize whether an action is a legal action or an illegal action, and subdivide a regulation violation type of the illegal action. For example, the types of illegal actions include but are not limited to: actions violating traffic lights, actions violating traffic indication lines, and illegal actions relevant to traffic accidents.

In the embodiment, after the classifiers re used to recognize the action type, a recognition probability value will be obtained.

In the embodiment, with the smooth filtration, the image noise may be filtered away, and optimized detection boxes with low probabilities of containing the object are removed, thereby obtaining re-optimized detection boxes.

Specifically for example, S230 may include but not limited to that: optimized detection boxes having probability values smaller than a smooth probability in the multiple image frames are filtered away to obtain optimized detection boxes that are not filtered away. S240 may include that: the optimized detection boxes that are not filtered away are connected in a time domain to obtain the action pipeline. In some embodiments, the smooth filtration includes but is not limited to an average value of the above probability values. Here is the example of performing smooth filtration on the optimized detection boxes based on the above probability values, and the particular implementation is not limited to the above example.

Figure 5:
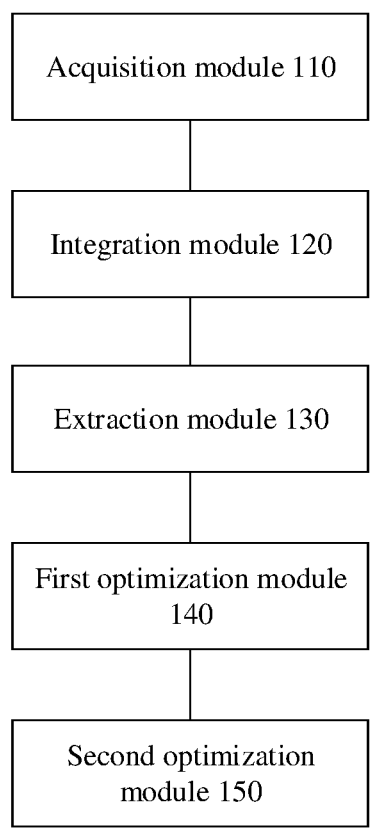
FIG. 5 illustrates a structural schematic diagram of an apparatus for object detection provided in embodiments of the disclosure.

As illustrated in FIG. 5, provided in the embodiment is an apparatus for object detection, including: an acquisition module 110, an integration module 120, an extraction module 130, a first optimization module 140, and a second optimization module 150.

The acquisition module 110 is configured to acquire n types of detection boxes associated with an object to be positioned, each type of detection boxes being determined by a respective one of n different object detectors. Each of the n different object detectors is capable of extracting a respective different type of image features from a same image, n being a positive integer equal to or greater than 2.

The integration module 120 is configured to obtain integrated detection boxes based on the n types of detection boxes.

The extraction module 130 is configured to enable each of the n different object detectors to extract image features from an input image based on the integrated detection boxes to obtain n types of image features.

The first optimization module 140 is configured to perform image feature optimization based on the n types of image features to obtain optimized image features.

The second optimization module 150 is configured to obtain optimized detection boxes according to the optimized image features so as to detect the object.

In some embodiments, the acquisition module 110, the integration module 120, the extraction module 130, the first optimization module 140, and the second optimization module 150 may all be program modules; and the program modules, when executed by a processor, can implement functions corresponding to the modules.

In some other embodiments, the acquisition module 110, the integration module 120, the extraction module 130, the first optimization module 140, and the second optimization module 150 may all be software and hardware combined modules. The software and hardware combined modules may include various programmable arrays which include but are not limited to Field Programmable Gate Arrays (FPGAs) or complex programmable arrays.

In still some embodiments, the acquisition module 110, the integration module 120, the extraction module 130, the first optimization module 140, and the second optimization module 150 may be purely hardware modules; and the purely hardware modules may include but are not limited to Application-Specific Integrated Circuits (ASICs).

In some embodiments, the first optimization module 140 is configured to: when the image feature optimization is executed for an $m^{th}$ time, optimize a $p^{th}$ type of image features in the n types of image features by using n-1 types of image features in the n types of image features, to obtain the optimized image features. The $p^{th}$ type of image features are a type of image features in the n types of image features other than the n-1 types of image features, m is an integer greater than 0, and p is an integer greater than 0 and smaller than or equal to n.

In some embodiments, $p=\mod(m/n)+1$.

In some embodiments, the first optimization module 140 is specifically configured to: when the image feature optimization is executed for the $m^{th}$ time, perform convolution on each type of image features in the n-1 types of image features to obtain convolutional features for each type of image features in the n-1 types of image features; and optimize the $p^{th}$ type of image features in the n types of image features by using the convolutional features, to obtain the optimized image features.

In some embodiments, the first optimization module 140 is specifically configured to: when the image feature optimization is executed for the $m^{th}$ time, perform first convolution on each type of image features in the n-1 types of image features to obtain n-1 types of first convolutional features; activate each type of first convolutional features in the n-1 types of first convolutional features to obtain n-1 types of activated features; perform second convolution on each type of activated features in the n-1 types of activated features to obtain the convolutional features for each type of image features in the n-1 types of image features; and optimize the $p^{th}$ type of image features in the n types of image features by using the obtained convolutional features for each type of image features in the n-1 types of image features, to obtain the optimized image features In some embodiments, the second optimization module 150 is configured to perform regression based on the optimized image features to obtain the optimized detection boxes.

In some embodiments, the integration module 120 is configured to merge detection boxes, each having a probability value no smaller than a probability threshold, in each type of detection boxes in the n types of detection boxes to obtain the integrated detection boxes.

In some embodiments, in a first time of acquiring the n types of detection boxes associated with the object to be positioned, the acquisition module 110 is configured to: use each of the n different object detectors to detect the object in the input image to obtain a respective type of detection boxes in the n types of detection boxes associated with the object to be positioned.

In some embodiments, in a $k^{th}$ time of acquiring the n types of detection boxes associated with the object to be positioned, each type of detection boxes being determined by a respective one of the n different object detectors, k being an integer greater than 1, the acquisition module 110 is specifically configured to acquire the following for each of the n different object detectors: detection boxes determined by the object detector in a $(k-1)^{th}$ time of acquiring the n types of detection boxes associated with the object to be positioned, each type of detection boxes being determined by a respective one of the n different object detectors; or optimized detection boxes corresponding to the object detector.

In some embodiments, the apparatus further includes: a connection module, and a tracking module.

The connection module is configured to connect optimized detection boxes for a plurality of image frames in a video to form an action pipeline of the object.

The tracking module is configured to track the object based on the action pipeline.

In some embodiments, the connection module is configured to: obtain re-detected image features based on the optimized detection boxes of a $q^{th}$ image frame, q being a positive integer; perform action type recognition based on the re-detected image features, and obtain, for each of the optimized detection boxes, a probability value corresponding to each action type; perform smooth filtration on the optimized detection boxes based on the probability values for the optimized detection boxes, to obtain optimized detection boxes having subjected to the smooth filtration; and associate, in a time domain, the optimized detection boxes having subjected to the smooth filtration, to obtain the action pipeline.

A particular example is provided below in combination with the above embodiments.

Example 1

In the method for object detection provided in the example, available information may be transferred from one model (which may be a neural network) to another model (which may be another neural network) by means of information transfer, thereby improving the feature extraction capabilities of the models by utilizing complementarity between features extracted by different models. Positioning proposals (i.e., the foregoing detection boxes) generated by one model are used to help another model to more accurately position the object in the image.

Through the above two methods, the complementary information between the different models is fully utilized in the level of features and in the level of generating positioning proposals.

In the method for object detection provided in the example, multiple action objects may be positioned based on an action positioning model with a deep learning framework.

Specifically for example, using the method provided in the embodiment of the disclosure to position actions in a video may include the following steps.

First of all, action positioning proposals are generated for an RGB image and an optical flow image in a current frame of a video by using a Faster-RCNN algorithm, and corresponding features are extracted. Here, a first type of image features are extracted from the RGB image, and a second type of image features are extracted from the optical flow image.

Then, complementary information is transferred from features of one model to another model by means of information transfer, and action positioning proposals generated by different models are fused to obtain complementary proposals. The complementary information herein may be image features obtained by performing convolution on one type of image features through a convolutional transmission channel and configured to reinforce another type of image features.

Next, the newly generated features, i.e., the image features for reinforcing another type of image features, and the action positioning proposals are used to classify and position an action in the current frame.

At last, an action position in each frame is serially connected by using a connection strategy, to obtain an action positioning result including start and end time points of actions, a spatial position of the action in each frame, and other information.

In the above steps, the information of the different models may be iterated for multiple times during mutual help of the features and the action proposals, thereby reinforcing the accuracy of the finally generated result.

The example includes action detection and temporal connection.

The input of an action detection model for detecting actions may be an RGB image and an optical flow image of the current frame of the video. The output of the action detection model includes detection boxes in the current frame of the video where actions may occur, and corresponding action types.

The specific processing process may include the following several steps.

Corresponding detection boxes and action types are respectively determined for the RGB image and the optical flow image by using the Faster-RCNN algorithm.

A set of detection boxes generated by the two different models is acquired, and each detection box is used to extract RGB and optical flow features respectively at corresponding positions. Features (such as optical flows) extracted by one model are added (information transfer), through two layers of 1*1 convolution, to features (such as RGB) extracted by another model, thereby obtaining stronger features.

The set of detection boxes and improved features obtained based on the foregoing steps are further classified and regressed by using a classifier and a regressor, to obtain more accurate detection boxes.

Iteration is performed for multiple times (for example, 4 or more times of iteration), to improve the accuracy of finally generated detection boxes.

The input of the temporal connection step is detection boxes generated for all frames, and corresponding action classes. The output of the temporal connection step is an action pipeline formed by connecting the detection boxes.

At last, object tracking or object behavioral analysis is performed based on the action pipeline.

The connection made to form the action pipeline may include: detection boxes produced by the action detection models from the video are connected in a time domain by using a connection strategy, to produce an action pipeline.

Each detection box in the action pipeline is used to extract features at the corresponding position, and then binary classification is used to determine whether an action occurs within the detection box and generate a probability of occurrence of the action.

A median filter is used to perform smooth filtration operation on the probability of occurrence an action in each detection box of the action pipeline. Any detection box having the probability of occurring an action lower than a threshold is removed to obtain a final action pipeline.

Figure 6:
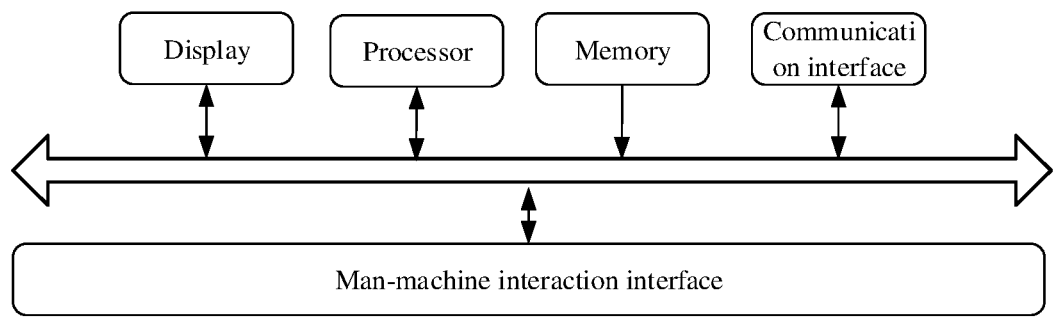
FIG. 6 illustrates a schematic structural diagram of an apparatus for object detection provided in embodiments of the disclosure.

As illustrated in FIG. 6, an apparatus for object detection is provided in the embodiment. The apparatus includes a memory and a processor.

The memory is configured to store computer executable instructions.

The processor is respectively connected to a display and the memory, and is configured to execute the computer executable instructions stored in the memory to implement the method for object detection provided in the above one or more technical solutions, such as the method for object detection illustrated in at least one of FIG. 1 to FIG. 4.

The memory may be various types of memories, and may be a Random Access Memory (RAM), a Read-Only Memory (ROM), a flash memory, etc. The memory may be configured to store information, for example, store the computer executable instructions. The computer executable instructions may be various program instructions, such as target program instructions and/or source program instructions.

The processor may be various types of processors, such as a central processor, a microprocessor, a digital signal processor, a programmable array, a digital signal processor, an Application Specific Integrated Circuit (ASIC) or an image processor.

The processor may be connected to the memory through a bus. The bus may be an integrated circuit bus, etc.

In some embodiments, the terminal device may further include: a communication interface. The communication interface may include: a network interface such as a local area network interface or a transceiving antenna. The communication interface is also connected to the processor, and can be used for information transceiving.

In some embodiments, the terminal device further includes a man-machine interaction interface. For example, the man-machine interaction interface may include various input/output devices, such as a keyboard, and a touch screen.

In some embodiments, the apparatus for object detection may further include: a display. The display may display various prompts, acquired facial images and/or various interfaces.

A computer storage medium is provided in embodiments of the disclosure. The computer storage medium stores computer executable instructions which, when executed, are capable of implementing the method for object detection provided in the above one or more technical solutions, such as the method for object detection illustrated in at least one of FIG. 1 to FIG. 4.

A computer program product is further provided in embodiments of the disclosure. The computer program product includes computer instructions, which when called by a computer device, causes the computer device to execute the method for object detection provided in the above one or more technical solutions, such as the method for object detection illustrated in at least one of FIG. 1 to FIG. 4.

In the several embodiments provided in the disclosure, it should be understood that the disclosed apparatus and method may be implemented in other manners. The apparatus embodiment described above is only schematic, and for example, division of the units is only division in logical functions, and other division manners may be used during practical implementation. For example, multiple units or components may be combined or integrated into another system, or some features may be neglected or not executed. In addition, coupling or direct coupling or communication connection between various displayed or discussed components may be indirect coupling or communication connection implemented through some interfaces, devices or units, and may be electrical, mechanical or in other forms.

The units described as separate parts may or may not be physically separated. Parts displayed as units may or may not be physical units, namely they may be located in the same place or may also be distributed to multiple network units. Some or all of the units may be selected according to a practical requirement to achieve the purposes of the solutions of the embodiments.

In addition, various function units in embodiments of the disclosure may be integrated into a processing module, or each unit may exist independently, or two or more units may be integrated into one unit. The integrated unit may be implemented in a hardware form, or may be implemented in form of hardware and software function unit.

Those of ordinary skill in the art should know that: all or some of the steps of the abovementioned method embodiment may be implemented by instructing related hardware through a program, the abovementioned program may be stored in a computer-readable storage medium, and the program is executed to execute the steps of the abovementioned method embodiment; and the storage medium includes: various media capable of storing program codes such as a mobile storage device, a Read-Only Memory (ROM), a Random Access Memory (RAM), a magnetic disk or an optical disc.

The above is only detailed description of the disclosure and is not intended to limit the scope of protection of the disclosure. Any variations or replacements apparent to the person skilled in the art within the technical scope disclosed by the disclosure shall fall within the scope of protection of the disclosure. Therefore, the scope of protection of the disclosure shall be subjected to the scope of protection of the claims.

The invention claimed is:

1. A method for object detection, comprising:
acquiring n types of detection boxes associated with an object to be positioned, each type of detection boxes being determined by a respective one of n different object detectors, wherein each of the n different object detectors is capable of extracting a respective different type of image features from a same image, n being a positive integer equal to or greater than 2;
obtaining integrated detection boxes based on the n types of detection boxes;

extracting, by each of the n different object detectors, image features from an input image based on the integrated detection boxes to obtain n types of image features;

performing image feature optimization based on the n types of image features to obtain optimized image features; and obtaining optimized detection boxes according to the optimized image features so as to detect the object;

wherein performing image feature optimization based on the n types of image features to obtain the optimized image features comprises:

when the method is executed for an $m^{th}$ time, optimizing a $p^{th}$ type of image features in the n types of image features by using n-1 types of image features in the n types of image features, to obtain the optimized image features, wherein the $p^{th}$ type of image features are a type of image features in the n types of image features other than the n-1 types of image features, m is an integer greater than 0, and p is an integer greater than 0 and smaller than or equal to n.

2. The method of claim 1, wherein optimizing the $p^{th}$ type of image features in the n types of image features by using the n-1 types of image features in the n types of image features, to obtain the optimized image features comprises:

performing convolution on each type of image features in the n-1 types of image features to obtain convolutional features for each type of image features in the n-1 types of image features; and optimizing the $p^{th}$ type of image features in the n types of image features by using the convolutional features, to obtain the optimized image features.

3. The method of claim 2, wherein performing convolution on each type of image features in the n-1 types of image features to obtain the convolutional features for each type of image features in the n-1 types of image features comprises:

performing first convolution on each type of image features in the n-1 types of image features to obtain n-1 types of first convolutional features;

activating each type of first convolutional features in the n-1 types of first convolutional features to obtain n-1 types of activated features; and performing second convolution on each type of activated features in the n-1 types of activated features to obtain the convolutional features for each type of image features in the n-1 types of image features.

4. The method of claim 1, wherein obtaining the optimized detection boxes according to the optimized image features comprises:

performing regression based on the optimized image features to obtain the optimized detection boxes.

5. The method of claim 1 wherein obtaining the integrated detection boxes based on the n types of detection boxes comprises:

merging detection boxes, each having a probability value no smaller than a probability threshold, in each type of detection boxes in the n types of detection boxes to obtain the integrated detection boxes.

6. The method of claim 1, wherein when the method is executed for a first time, acquiring the n types of detection boxes associated with the object to be positioned, each type of detection boxes being determined by a respective one of the n different object detectors, comprises:

using each of the n different object detectors to detect the object in the input image to obtain a respective type of detection boxes in the n types of detection boxes associated with the object to be positioned.

7. The method of claim 1, wherein when the method is executed for a $k^{th}$ time, k being an integer greater than 1, acquiring the n types of detection boxes associated with the object to be positioned, each type of detection boxes being determined by a respective one of the n different object detectors, comprises:

for each of the n different object detectors, acquiring detection boxes determined by the object detector or optimized detection boxes corresponding to the object detector when the method is executed for a $(k-1)^{th}$ time.

8. The method of claim 1, further comprising:

connecting optimized detection boxes for a plurality of image frames in a video to form an action pipeline of the object; and tracking the object based on the action pipeline.

9. The method of claim 8, wherein connecting the optimized detection boxes for the plurality of image frames in the video to form the action pipeline of the object comprises:

obtaining re-detected image features based on the optimized detection boxes of a $q^{th}$ image frame, q being a positive integer;

performing action type recognition based on the re-detected image features, and obtaining a probability value corresponding to each action type;

performing smooth filtration on the optimized detection boxes based on the probability value to obtain optimized detection boxes having been subjected to the smooth filtration; and associating, in a time domain, the optimized detection boxes having been subjected to the smooth filtration, to obtain the action pipeline.

10. A device for object detection, comprising:

a memory, configured to store computer-executable instructions; and a processor, connected to the memory, and configured to implement, by executing the computer-executable instructions, a method for object detection, the method comprising:

acquiring n types of detection boxes associated with an object to be positioned, each type of detection boxes being determined by a respective one of n different object detectors, wherein each of the n different object detectors is capable of extracting a respective different type of image features from a same image, n being a positive integer equal to or greater than 2;

obtaining integrated detection boxes based on the n types of detection boxes;

extracting, by each of the n different object detectors, image features from an input image based on the integrated detection boxes to obtain n types of image features;

performing image feature optimization based on the n types of image features to obtain optimized image features; and obtaining optimized detection boxes according to the optimized image features so as to detect the object;

wherein performing image feature optimization based on the n types of image features to obtain the optimized image features comprises:

when the method is executed for an $m^{th}$ time, optimizing a $p^{th}$ type of image features in the n types of image features by using n-1 types of image features in the n types of image features, to obtain the optimized image features, wherein the $p^{th}$ type of image features are a type of image features in the n types of image features other than the n-1 types of image features, m is an integer greater than 0, and p is an integer greater than 0 and smaller than or equal to n.

11. The device of claim 10, wherein optimizing the $p^{th}$ type of image features in the n types of image features by using the n-1 types of image features in the n types of image features, to obtain the optimized image features comprises:
performing convolution on each type of image features in the n-1 types of image features to obtain convolutional features for each type of image features in the n-1 types of image features; and
optimizing the $p^{th}$ type of image features in the n types of image features by using the convolutional features, to obtain the optimized image features.

12. The device of claim 11, wherein performing convolution on each type of image features in the n-1 types of image features to obtain the convolutional features for each type of image features in the n-1 types of image features comprises:
performing first convolution on each type of image features in the n-1 types of image features to obtain n-1 types of first convolutional features;
activating each type of first convolutional features in the n-1 types of first convolutional features to obtain n-1 types of activated features; and
performing second convolution on each type of activated features in the n-1 types of activated features to obtain the convolutional features for each type of image features in the n-1 types of image features.

13. The device of claim 10, wherein obtaining the optimized detection boxes according to the optimized image features comprises:
performing regression based on the optimized image features to obtain the optimized detection boxes.

14. The device of claim 10, wherein obtaining the integrated detection boxes based on the n types of detection boxes comprises:
merging detection boxes, each having a probability value no smaller than a probability threshold, in each type of detection boxes in the n types of detection boxes to obtain the integrated detection boxes.

15. The device of claim 10, wherein
when the method is executed for a first time, acquiring the n types of detection boxes associated with the object to be positioned, each type of detection boxes being determined by a respective one of the n different object detectors, comprises:
using each of the n different object detectors to detect the object in the input image to obtain a respective type of detection boxes in the n types of detection boxes associated with the object to be positioned; or
when the method is executed for a $k^{th}$ time, k being an integer greater than 1, acquiring the n types of detection boxes associated with the object to be positioned, each type of detection boxes being determined by a respective one of the n different object detectors, comprises:
for each of the n different object detectors, acquiring detection boxes determined by the object detector or optimized detection boxes corresponding to the object detector when the method is executed for a $(k-1)^{th}$ time.

16. The device of claim 10, wherein the processor is further configured to implement:
connecting optimized detection boxes for a plurality of image frames in a video to form an action pipeline of the object; and
tracking the object based on the action pipeline.

17. The device of claim 16, wherein connecting the optimized detection boxes for the plurality of image frames in the video to form the action pipeline of the object comprises:
obtaining re-detected image features based on the optimized detection boxes of a $q^{th}$ image frame, q being a positive integer;
performing action type recognition based on the re-detected image features, and obtaining a probability value corresponding to each action type;
performing smooth filtration on the optimized detection boxes based on the probability value to obtain optimized detection boxes having been subjected to the smooth filtration; and
associating, in a time domain, the optimized detection boxes having been subjected to the smooth filtration, to obtain the action pipeline.

18. A non-transitory computer-readable storage medium having computer executable instructions stored thereon, wherein the computer executable instructions, when executed by a processor, implement a method for object detection, the method comprising:
acquiring n types of detection boxes associated with an object to be positioned, each type of detection boxes being determined by a respective one of n different object detectors, wherein each of the n different object detectors is capable of extracting a respective different type of image features from a same image, n being a positive integer equal to or greater than 2;
obtaining integrated detection boxes based on the n types of detection boxes;
extracting, by each of the n different object detectors, image features from an input image based on the integrated detection boxes to obtain n types of image features;
performing image feature optimization based on the n types of image features to obtain optimized image features; and
obtaining optimized detection boxes according to the optimized image features so as to detect the object;
wherein performing image feature optimization based on the n types of image features to obtain the optimized image features comprises:
when the method is executed for an $m^{th}$ time, optimizing a $p^{th}$ type of image features in the n types of image features by using n-1 types of image features in the n types of image features, to obtain the optimized image features,
wherein the $p^{th}$ type of image features are a type of image features in the n types of image features other than the n-1 types of image features, m is an integer greater than 0, and p is an integer greater than 0 and smaller than or equal to n.

* * * * *